United States Patent [19]

White, Jr.

[11] 4,131,030
[45] Dec. 26, 1978

[54] COVERING FOR POWER TRANSMISSION BELT

[75] Inventor: Jack D. White, Jr., Springfield, Mo.

[73] Assignee: Dayco Corporation, Dayton, Ohio

[21] Appl. No.: 847,964

[22] Filed: Nov. 2, 1977

[51] Int. Cl.² .......................... F16G 5/08; F16G 5/12
[52] U.S. Cl. ..................................... 74/232; 156/139; 74/231 P
[58] Field of Search .......... 74/231 R, 231 C, 231 CB, 74/232, 233, 234, 237; 156/137, 138, 139, 140, 141, 142; 428/294, 295; 264/46.9

[56] References Cited

U.S. PATENT DOCUMENTS

| 577,375 | 2/1897 | Brown | 74/232 |
|---|---|---|---|
| 1,307,731 | 6/1919 | Gates | 74/232 |
| 2,336,149 | 12/1943 | Freedlander | 156/142 |
| 2,429,994 | 11/1947 | Crosby | 74/233 |
| 2,582,366 | 1/1952 | White | 74/233 |
| 2,711,778 | 6/1955 | Waugh | 156/140 |
| 3,759,112 | 9/1973 | Polshikov et al. | 74/231 R |
| 3,924,482 | 12/1975 | Meadows | 156/139 |
| 3,987,684 | 10/1976 | Fisher et al. | 74/233 |
| 4,031,768 | 6/1977 | Henderson et al. | 74/233 |

FOREIGN PATENT DOCUMENTS

| 1340918 | 9/1963 | France | 74/237 |
|---|---|---|---|
| 236324 | 7/1925 | United Kingdom | 74/232 |
| 1400799 | 7/1975 | United Kingdom | 74/231 R |

Primary Examiner—Samuel Scott
Assistant Examiner—William R. Henderson
Attorney, Agent, or Firm—Reuben Wolk

[57] ABSTRACT

An endless power transmission belt having a trapezoidal cross-section comprising a belt body, two cord fabric cover layers, and a layer of woven fabric located between said belt body and said cord fabric cover layers; said cord fabric comprising strength cords extending at an angle to the longitudinal axis of the belt, and weak tie strands holding said strength cords in parallel position, the strength cords of one cord fabric cover layer extending at substantially opposite angles to the strength cords of the other cord fabric cover layer.

6 Claims, 1 Drawing Figure

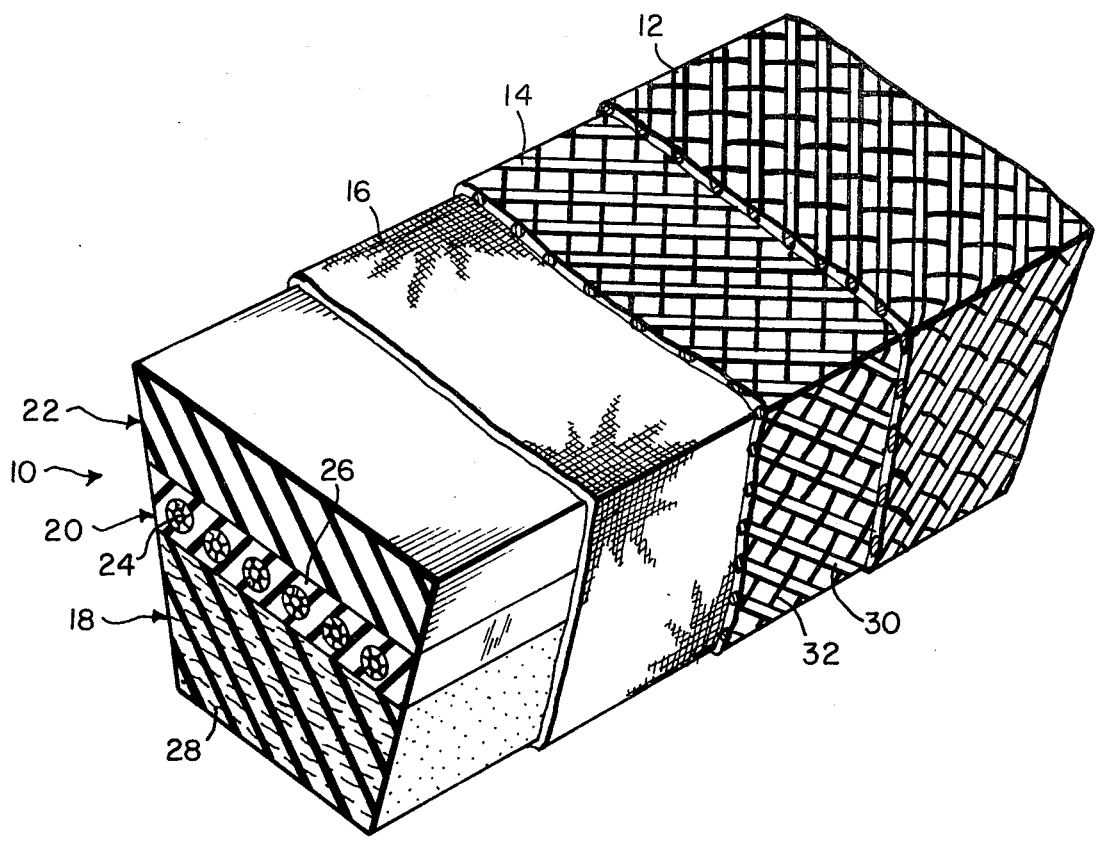

COVERING FOR POWER TRANSMISSION BELT

BACKGROUND OF THE INVENTION

This invention relates to endless power transmission belts, and in particular to belts employed in agricultural applications.

It is known in the art to provide a woven fabric cover on an endless power transmission belt body so that the cover is a bias cover in that it has warps and wefts arranged at an angle with respect to the longitudinal axis of the belt. Belts having one or more bias-cut fabric covers are shown in U.S. Pat. Nos. 2,393,373, 2,414,822, and 2,661,045. Such a bias cover is provided to improve the flexibility of the belt as it operates in an endless path about associated pulleys or sheaves. A woven fabric cover does not, however, provide adequate wear resistance for belts operating in a dusty environment, such as those used on agricultural machinery.

It is also known to provide an endless power transmission belt with an outer cover formed from a cord material wrapped helically around the belt with adjoining turns of the cord material being held together by a rubber-like binder. U.S. Pat. No. 3,411,970 discloses a belt having either a cord or a textile fabric cover. Although the cord material provides better wear resistance than the textile fabric cover, when operated in a dusty environment another problem arises in that dust attacks and thus tends to deteriorate the rubber-like binder. The cover-defining cord material then tends to separate from the belt body and cause premature failure of the belt.

It is therefore an object of the present invention to provide an improved endless power transmission belt, capable of operating in a dusty environment and having adequate wear resistance.

Other objects, aspects and advantages of the present invention will be apparent to those skilled in the art from a reading of the following description of the invention, the attached drawing and the appendixed claims.

SUMMARY OF THE INVENTION

In accordance with the present invention, there is provided an endless power transmission belt capable of operating in a dusty environment. The belt comprises a belt body, at least one cover layer consisting of a cord fabric, and a layer of woven fabric interposed between the belt body and the cord fabric cover layer.

BRIEF DESCRIPTION OF THE DRAWING

The single FIGURE is a perspective view with parts broken away illustrating the preferred embodiment of this invention.

DETAILED DESCRIPTION OF THE DRAWING

Referring now to the drawings, the belt of this invention comprises a belt body, designated generally by the numeral 10, an outer cover layer of cord material 12, an inner cover layer of cord material 14, and a layer of woven fabric 16 interposed between the layer 14 and the belt body 10.

The belt body 10 is trapezoidal in cross-section and comprises a compression section 18, a load-carrying section 20 and a tension section 22, and such belt is made primarily of elastomeric materials. The load-carrying section 20 has a helically wound load-carrying cord 24 which is embedded in a gum-like elastomeric matrix 26, such as neoprene rubber, to provide a cushion on opposite sides of and completely around the cord 24. The helically-wound load-carrying cord 24 can be made of any suitable material known in the art, and similarly the elastomeric matrix or cushion 26 can also be made of any suitable material which is compatible with the cord 24. The material 26 is also of a material compatible with the materials used to define the sections 18 and 22 to assure a tenacious bond therebetween. It will also be appreciated that any other suitable load-carrying means may be provided in the belt 10 in place of the helically-wound load-carrying cord 24.

The tension section 22 is made of any suitable elastomeric material.

The compression section 18 is made of any suitable elastomeric material and, in the embodiment shown, contains a plurality of discrete fibers 28 which are oriented transverse to the endless path of the belt 10. These fibers may be made of any suitable material such as cotton, rayon, polyester, nylon, aramid and the like, including blends thereof. However, it should be understood that these fibers may be omitted.

The fabric layer 16 is made of a suitable textile material and such layer may be in the form of a woven textile fabric having the usual warps and wefts therein arranged at substantially 90° to each other. The fabric layer 16 is preferably coated or impregnated with a rubber or rubber-like material to provide it with sufficient tackiness to be properly adhered to the belt body during the building application and to become integrated therewith upon vulcanization. The fabric itself is preferably plain woven having substantially the same weight and number of threads in both the warp and weft directions. Further, the square woven fabric should be cut and laid on the bias, that is, with its threads at an angle to the longitudinal axis of the belt. Cotton or the various synthetic fibers, such as nylon, rayon, polyester, aramid or the like, or mixtures thereof, in staple lengths or continuous filaments may be employed in the fabric.

It is also feasible to utilize a fabric in which the warp and weft threads are at an angle between 95 and 155 degrees to each other, referred to as "stress-relieved" fabric, which is more fully described in U.S. Pat. Nos. 3,478,613 and 3,564,933.

The cord material of layers 14 and 12 is a so-called cord fabric which is often referred to in the art as "tire cord." This material comprises a plurality of substantially parallel strength cords 30 and comparatively weak tie strands 32 interwoven with the cords 30 to hold them parallel to each other. The cord layers 12 and 14 are preferably coated or impregnated with a rubber or rubber-like material to provide them with sufficient tackiness to be properly adhered to each other and to the fabric layer 16 during the building application and to become integrated therewith upon vulcanization.

The cord layers 12 and 14 which are illustrated are cut and laid such that the strength cords 30 are at an angle to the longitudinal axis, and the tie cords 32 are at an opposite angle to the longitudinal axis of the belt. The layers 12 and 14 are laid so that the strength cords of each layer extend in opposite directions. It is also possible to apply one of the cover layers in such a manner that the strength cords 30 extend transversely of the longitudinal axis instead of at an angle thereto as shown.

The belt of this invention can be made using any suitable technique known in the art. For example, a plurality of such belts can be made by first winding or suitably coiling a suitable elastomeric material on a drum or cylinder to form a portion which becomes the compression section of the belt. A load-carrying cord would then be spirally wound or wrapped in position after placing a desired thickness of a gum-like elastomeric material around the first material, followed by another layer of gum-like material around the longitudinally extending cord. The belt buildup would be completed by wrapping an elastomeric material to define a portion which eventually constitutes the tension section.

The resulting construction would be in the form of a so-called belt sleeve which would then be cut to define a plurality of belt bodies such as the belt body 10. Each belt body 10 would then be covered with a woven fabric which defines layer 16, and thereafter covered with two or more cover layers 12 and/or 14. The resulting wrapped belt would then be cured and cooled using any suitable technique known in the art.

The belt of this invention can be made of any suitable elastomeric material, including natural rubber, synthetic rubber, or any suitable plastic material, or mixtures thereof.

Reasonable variations and modifications, which will be apparent to those skilled in the art, can be made in this invention without departing from the spirit and scope thereof.

I claim:

1. An endless power transmission belt having a trapezoidal cross-section comprising a belt body, two cord fabric cover layers, and a layer of woven fabric located between said belt body and said cord fabric cover layers; said cord fabric comprising strength cords extending at an angle to the longitudinal axis of the belt, and weak tie strands holding said strength cords in parallel position, the strength cords of one cord fabric cover layer extending at substantially opposite angles to the strength cords of the other cord fabric cover layer.

2. The belt of claim 1 wherein said belt body is made primarily of elastomeric materials.

3. The belt of claim 2 wherein said belt body comprises a compression section, a load-carrying section and a tension section.

4. The belt of claim 3 wherein said compression section comprises an elastomeric material having discrete fibers dispersed therethrough.

5. The belt of claim 4 wherein said fibers are oriented substantially transverse to the longitudinal axis of said belt.

6. A method of covering an endless power transmission belt comprising the steps of providing a belt body having a trapezoidal cross-section, applying a woven fabric layer around said body, forming a first cord fabric with strength cords and weak tie strands holding said cords in a parallel direction, applying said first cord fabric as a first cover layer around said woven fabric layer, forming a second cord fabric similar to said first cord fabric, and applying said second cord fabric as a second cover layer around said first cover layer so that the strength cords of said first and second cover layers extend at substantially opposite angles to each other.

* * * * *